UNITED STATES PATENT OFFICE.

COLUMBUS F. STURGIS, OF CARLOWVILLE, ALABAMA.

IMPROVEMENT IN THE MANUFACTURE OF PAPER-PULP.

Specification forming part of Letters Patent No. 16,949, dated March 31, 1857.

*To all whom it may concern:*

Be it known that I, COLUMBUS F. STURGIS, of the county of Dallas, State of Alabama, have invented a new process for the manufacture of paper-pulp from the bark of the root or other fibrous parts of the cotton-plant, which material may be used alone, or in combination with any of the substances of which paper is made; and I hereby declare that the following is a full and exact description of the same.

To enable others to use my invention, I will proceed to describe the process, which is substantially as follows:

The material I employ in the manufacture of paper-pulp is, in the most perfect state, to be gathered rapidly and with care about the time of the last gatherings of cotton, before the decomposition begins at the surface of the ground. All the bark upon the stalk is apt to be a loss if gathered after it begins to decay at the surface. The bark of the root, however, may be gathered at any time, and much of it will be found in a good state of preservation when breaking up land for spring crops. I would recommend that the two—viz., the bark of the root and the bark of the stalk—be gathered and packed separately, as they ought to be distinguished as Nos. 1 and 2. My reasons are that the bark of the root is in many respects preferable, because, first, it is less perishable, and therefore more apt to be gathered in a perfect state; second, it has little or no coloring-matter, and therefore requires less bleaching, almost none; third, it is possessed of more mucilage.

The material thus gathered is submitted to the following series of operations: The bark stripped from the roots and stalk of the cotton-plant is to be freed from impurities, such as dirt or soil, the epidermis or their skin that invests it. In my earlier experiments I naturally supposed that the use of warm or hot water would effect the removal of the epidermis with which the material is invested, and other impurities, more readily and perfectly than if cold. After numerous experiments I found that the material is possessed of a highly gummy or mucilaginous quality which is very soluble in hot water, but not at all soluble in cold, and consequently by using hot water in the earlier stages of the process the entire mass of impurities and all was reduced to a pasty consistency not at all favorable to the separation of the impure and useless parts of the material. I therefore use cold or very tepid water in all the washings necessary for the removal of impurities; but as soon as the material is sufficiently cleansed from the impure parts the application of hot water brings the material into a condition to be operated upon by the pulping-machine in a very short time.

It will be perceived that by this mode of washing the material the gum or mucilage naturally contained in it will be preserved as a sizing for the paper. This part of the process may be performed by a washing-machine of simple construction, or it may be completed by being operated upon for a short time by the pulping-machine, cold water alone being employed. When thus cleansed and prepared it is to be well soaked in a moderate quantity of hot water, merely sufficient to render it pliable to the machinery for pulping. When sufficiently softened by the action of hot water it is to be subjected to the operation of grinding or pounding by any suitable machinery, to which operation the ordinary pulping-machine is well adapted, hot water being added from time to time, but in quantities no greater than sufficient to bring and continue the material under the machinery for pulping. During this part of the process the material is to be kept as near as convenient to a pasty consistency, and it is to be continued until there is to the naked eye but little or no appearance of fiber.

An excellent material for papier-maché goods can be obtained by using the matter in its half-pulped state. Where the material is to be used in combination with other substances, economy dictates that the pulping and bleaching of each be performed separately. The reason of this is based upon the difference which the materials themselves may present. One substance may require more bleaching material than the other. Unnecessary waste would then occur from the two substances being mixed together. Inconvenience may also arise by subjecting both materials to the same chemicals, or to the same intensity of their action. When the mass has been reduced to the condition of a smooth pasty consistency, with little appearance of fiber, then the hot water may be added in larger quantities and the pulping process continued until the requisite degree of fineness is attained, which may differ for the different sorts of paper. At this stage of the operation the bleaching and sizing, if not sufficiently performed by the process itself, may be performed in the ordinary way, and it may be proper to state that the ordinary chemical agents employed in the reduction and bleaching of rags and other materials are in moderate quantities serviceable in the reduction and bleaching of this, and that it can be worked upon the ordinary machinery without essential modification, except the dispensing with some parts.

From the above description it will be seen that not only have I discovered a material which for cheapness, abundance, constancy of supply, and facility of management will doubtless be unsurpassed as a material for the production of paper-pulp, but that I have succeeded by constant experiments to reduce my discovery to successful practice—i. e., having invented a process of manufacturing paper-pulp adapted to this material, which process is far more simple and economical than the processes usually adopted, as will be clearly seen from the following: It dispenses with all such operations as picking, dusting, cutting, and tearing, requiring only that the material shall be cleansed by washing in cold water before the pulping process commences. It produces paper-pulp with far greater economy of time and labor, of machinery, &c. It either dispenses with bleaching altogether or renders the operation far more expeditious and economical, according to the varieties of paper to be produced.

Having now fully described my invention, what I claim, and desire to secure by Letters Patent, is—

The within-described process of manufacturing paper-pulp from the bark of the root and the bark of the stalk of the cotton-plant.

In testimony whereof I have signed my name to this specification before two subscribing witnesses.

COLUMBUS F. STURGIS.

Witnesses:
  P. E. YOUNGBLOOD,
  J. A. LEE.